United States Patent [19]

Minden

[11] 4,352,562
[45] Oct. 5, 1982

[54] PASSIVE RING LASER RATE OF TURN DEVICE WITH ACOUSTO-OPTIC MODULATION

[75] Inventor: Henry T. Minden, Concord, Mass.
[73] Assignee: Sperry Corporation, New York, N.Y.
[21] Appl. No.: 166,732
[22] Filed: Jul. 7, 1980
[51] Int. Cl.³ .................................. G01C 19/64
[52] U.S. Cl. .................................... 356/350
[58] Field of Search ........................ 356/350
[56] References Cited

U.S. PATENT DOCUMENTS 4,135,822  1/1979  Ezekiel ........................... 356/350
4,273,444  6/1981  Pool et al. ....................... 356/350

OTHER PUBLICATIONS

"Techniques for Shotnoise Limited Inertial Rotation Measurement Using a Multiturn Fiber SAGNAC Interferometer", Davis and Ezekiel SPIE, vol. 157 (1978), pp. 131-136.

*Primary Examiner*—Vincent P. McGraw
*Attorney, Agent, or Firm*—Howard P. Terry; Seymour Levine

[57] ABSTRACT

A ring resonator wherein the frequency of a laser beam is altered by passing the beam through an acoustooptic modulator which is controlled by a voltage controlled oscillator (VCO) in a stabilization feedback loop. The acoustooptic modulator is capable of modulating the laser at modulation frequencies well up into the radio frequency range as is required for cavity stabilization.

7 Claims, 2 Drawing Figures

PASSIVE RING LASER RATE OF TURN DEVICE WITH ACOUSTO-OPTIC MODULATION

BACKGROUND OF THE INVENTION

1. Field of the Invention

The present invention relates to passive ring resonators utilizing counter-rotational beams of electromagnetic energy to sense the rate of rotation of such resonators through the shift in resonant frequency induced by rotation about an inertial axis.

2. Description of the Prior Art

Ring resonators of the prior art normally include an active lasing medium disposed therewithin to direct light waves emitted in the active medium in opposite directions around a closed loop, normally planar path. The counter-rotating light beams form an effective standing wave pattern and oscillate at the same frequency when their respective path lengths are equal, but at different frequencies when the path lengths are unequal because of rotation of the path loop about an inertial axis generally perpendicular to the propagation plane of the light waves. Through the detection of this frequency difference, the active ring laser of the prior art is enabled to sense the rate of rotation of its path loops and thus has found wide acceptance in navigation and guidance applications. The prior art ring laser rate of turn device is well suited to use in modern navigation and guidance systems employing high speed data processing because it can be turned on very rapidly and provides virtually instantaneous response to input rotation rate changes. Typical practical forms of such ring laser devices are disclosed in the following U.S. Pat. Nos. assigned to Sperry Corporation:

- C. C. Wang—3,382,758 for a "Ring Laser Having Frequency Offsetting Means Inside Optical Path", issued May 14, 1968,
- W. M. Macek—3,382,759 for a "Ring Laser Biased by Zeeman Frequency Offset Effect for Sensing Slow Rotations", issued May 14, 1968,
- W. M. Macek—3,382,760 for a "Coherent Light Frequency Difference Sensor", issued May 14, 1968,
- W. M. Macek—3,508,831 for a "Ring Laser Having Minimized Frequency Locking Characteristic", issued Apr. 28, 1970, and
- W. M. Macek—3,480,878 for a "Ring Laser With Means for Reducing Coupling to Backscattered Waves", issued Nov. 25, 1969.

The foregoing patents testify to the fact that such active ring rate of turn laser devices, i.e., those having an internal gain mechanism within the measuring ring, demonstrate undesired mode locking phenomena proximate the zero rate of rotation situation. In this condition, the measured output frequency undesirably remains constant over a small range of rates of rotation including and on each side of zero rate of turn. Accordingly, measures must be taken to overcome this effect, such as by the use of mirrors in the laser ring resonator designed to minimize back scatter of light and by the use of rate biasing techniques which induce a significant difference in frequency between the counter-rotating beams, desirably preventing mode locking at the zero rate of turn condition.

Passive ring rate of turn measurement devices, i.e., those containing no active gain element within the measuring ring or loop, have been recently demonstrated, as reported by S. Ezekiel and S. R. Balsamo, "Passive Ring Resonator Gyroscope", *Applied Physics Letters*, Vol. 30, page 478 et seq. (1977). Related material is presented in the S. Ezekiel U.S. Pat. No. 4,135,822, issued Jan. 23, 1979 for a "Laser Gyroscope". Since the passive ring device does not include a gain medium within its passive ring, some of the problems associated with the presence of such a gain medium are avoided. However, such prior art passive ring resonator devices have used detection schemes wherein each of the counter-rotating beams is measured and, by means of one or more closed loop feed back schemes, the frequency characterizing at least one of the counter-rotating light beams is adjusted to a predetermined value. There is no attempt to generate a useful rotation rate output signal until this adjustment is accomplished by the feed back apparatus. While fast acting components for such feed back servo schemes are available, the noise introduced in practice by the use of such components increases with increasing speed of response, introducing a significant source of error into the output of the rate of turn system. Accordingly, such prior art passive resonator rate of turn devices do not match the capabilities of high speed data processor systems normally employed in precision navigation.

In order to overcome some of the problems of prior art passive ring rate of turn measurement apparatus, the device of the C. D. Lustig U.S. Pat. No. 4,274,742 issued June 23, 1981 for a "Passive Ring Laser Rate of Turn Indicator" and assigned to Sperry Corporation, was proposed. In the Lustig arrangement, a ring laser system is provided having means forming a passive resonator for the propagation of clockwise and counter-clockwise beams of electromagnetic energy. The clockwise and counter-clockwise resonant frequencies are oscillated between respective first and second distinct values. Detector means are provided for producing signals with amplitudes indicative of the amplitudes of the first and second beams. A further means is coupled with the detector means for producing a rotation rate signal proportional to the algebraic combination of the signals indicative of the amplitudes of the first and second beams. By dispensing with closed loop feed back arrangements to provide an output signal indicative of rotation rate, the invention provides rapid response to changes in the rotation rate of the passive resonator and is thus adapted for use with high speed data processors.

In the aforementioned Ezekial and Lustig devices, the resonant optical path is stabilized at the resonance frequency by mounting one of the mirrors on an electrically activated piezoelectric element. The resonant ring path length is adjusted by varying a d.c. bias voltage applied across the piezoelectric element; the path length itself is also modulated by applying an alternating voltage across the element. The depth of the latter modulation is great enough to span the half-power points of the resonance curve so as to maximize the sensitivity of the stabilization feed back loop.

The laser light flowing through the resonant path is detected by a photodetector coupled in the stabilization loop. If the path length is off resonance, no light is transmitted to the photodetector; at resonance, maximum light is transmitted. If the bias voltage is such that the modulation is symmetric about the resonance point, the photodetector output at the modulation frequency is zero. When slightly off resonance, the amplitude of the photosignal depends on the magnitude of the departure of the bias from the resonance condition and its sign depends on the associated directional sense of departure. The feed back control uses the photodetector signal to adjust the bias to bring the optical path back to its resonance point.

One of the problems of the prior art solved according to the present invention relates to the band width of the feed back loop and the noise frequency spectrum. Microphonic conditions cause high finesse optical resonators to show noise fluctuations from resonance; these fluctuation frequencies reach up into the high audio range. For the stabilization loop to respond to such high frequency fluctuations, the modulation signal must be high compared to the noise frequencies.

The conventional piezoelectric path length modulator on which one of the mirrors is customarily mounted is massive and cannot be driven at frequencies higher than about a few hundred Hertz. At higher frequencies, mechanical inertia severely distorts the detected line shape. At frequencies in excess of a few kilo-Hertz, the mirror-driver system completely fails to respond to the input modulation signal.

Fluctuations in the resonant optical path or line jitter not only cause problems in the stabilization loop but, under certain circumstances, they add excessive noise to the rate signal output itself. It is observed experimentally that the two resonances of the counter-rotating light beams occur at optical path lengths which often differ by large amounts compared to the line displacements caused by rotation. In a high finesse ring with confocal mirrors, slight differences in the direction or point of entry of the light beams into the resonant path can lead to such large errors. This resonance separation will appear at the rate of turn output as a high rate bias. These fluctuations cause the optical path length to sweep randomly between the two resonances, and this effect superimposes a large noise signal on the difference in the voltage output by the two photodetectors.

SUMMARY OF THE INVENTION

A passive ring laser rate of turn device with acousto-optic modulation in accordance with the principles of the present invention includes an acousto-optic modulator which frequency modulates an incident monochromatic light beam and illuminates a beam splitting system with a frequency modulated light beam. The beam splitting system establishes two frequency modulated light beams that are coupled to a passive ring to traverse the closed path therewithin in opposite directions, the bandwidth of the modulation provided by the acousto-optic modulator being sufficient to sweep through the resonance bandwidth of the passive ring. Photodetectors, having their electrical output terminals coupled to a difference amplifier, are coupled to the passive ring to receive the two frequency modulated light beams therewithin. The electrical output terminal of the photodetector associated a first beam of the two oppositely directed beams and the output signal of an oscillator that provides the modulation frequency are coupled to a phase sensitive detector, the d.c. signal output of which is a function of the resonant path length and the center frequency of the first beam. This d.c. signal is summed with the modulating signal to drive a voltage controlled oscillator, the output signal of which is coupled to the acousto-optic modulator to position the frequency modulation of the incident monochromatic beam about a center frequency corresponding to the resonant path length of the first beam. This feedback provides a light beam, incident to the passive ring, that is frequency modulated about the ring's resonant frequency and permits a cavity stabilization capable of responding to rapid noise fluctuations.

In another embodiment of the invention, a second acousto-optic modulator is positioned in the beam splitting system to shift the center frequency of the second of the two oppositely directed beams coupled to the passive ring. In this embodiment the electrical outputs of the two photodetectors are coupled to a difference amplifier, the output signal of which and the output signal of the modulation frequency oscillator are coupled to a second phase detector which provides a d.c. signal output representative of the frequency difference between the two oppositely directed beams within the passive loop. This difference frequency representative signal is coupled to a second voltage controlled oscillator, the output of which is coupled to the second acousto-optic modulator to shift the center frequency of the frequency modulation of the second beam to the resonant frequency of the path traversed by this second beam, thus locking the output frequency of the second voltage controlled oscillator to the rate of turn of the passive loop. Other features and advantages of the invention will become apparent from the following detailed description.

DESCRIPTION OF THE PREFERRED EMBODIMENTS

Figure 1:
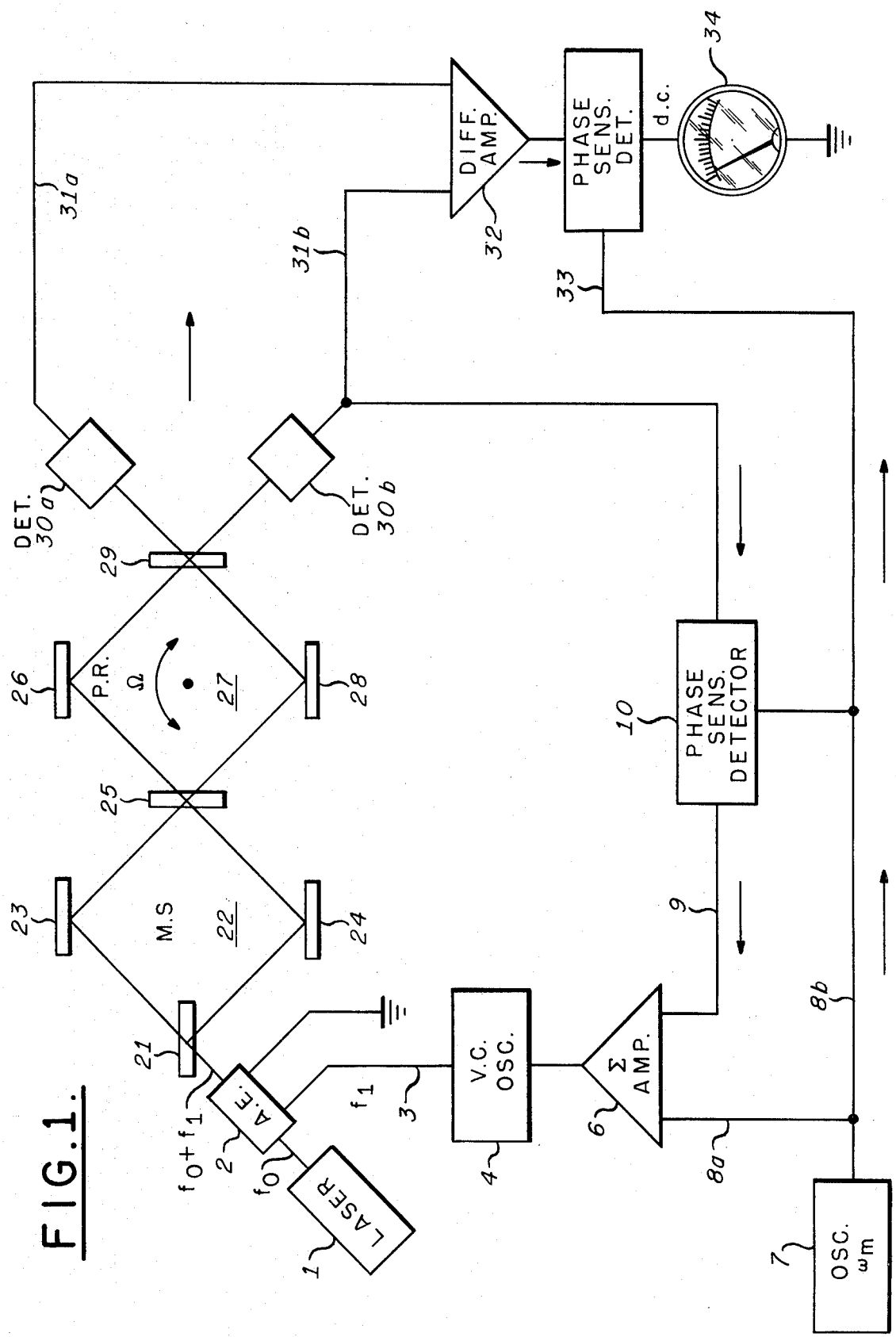
FIG. 1 is a diagram of one embodiment of the invention showing the disposition of optical and electrical components and their interconnections.

In the several embodiments of the invention, the passive rate of turn measuring ring (P.R) 27 may be defined by mirrors equivalent to mirrors 25,26,28,29 of FIG. 1 normally spaced about and facing a geometric center 34 about which rotation of the passive ring 27 occurs at a variable angular rate $\Omega$. It is understood that the mirrors 25,26,28,29, as well as other elements yet to be described, are affixed to the frame of the craft to be navigated with the cooperation of the invention. Optical excitation of the passive measuring ring P.R. is supplied by a mirror system M.S. 22 designed to split an incident electromagnetic beam to produce two beams of electromagnetic energy appropriately directed along clockwise and counter-clockwise resonant paths in the passive measuring ring 27.

The mirror system M.S. is formed by fully reflecting mirrors 23 and 24 in cooperation with optical divider 21 and partially reflecting mirror 25. The necessary light beams for exciting the passive ring P.R. are derived from a single laser source 1 via an acousto-optic modulator 2 by the mirror system M.S. using the optical transmission power dividing element 21. When the two light beams are formed in FIG. 1, they ideally depart from beam divider 21 along different paths and therefore the opposed fully reflecting mirrors 23, 24 are used to introduce them along exactly equivalent paths through partially reflecting mirror 25 in the passive ring P.R. The beams flow therein in opposite directions in the same path about ring P.R., portions of the counter-flowing optical energy passing through partially reflecting mirror 29 into conventional photodetectors 30a, 30b. Amplitude detector 30a is associated with the counter-clockwise light flow, while amplitude detector 30b is associated with the clockwise flow. Still referring to FIG. 1, the output signals of photodetectors 30a, 30b are coupled via leads 31a, 31b to a conventional differential amplifier 32 to yield a combined output signal having an amplitude and polarity that are functions of the rotation rate and sense. The output signal of amplifier 32 and the sine wave reference output of an oscillator 7, operating at a frequency $f_m$, are coupled to the two inputs of a conventional phase sensing detector 33. The detector output has an amplitude proportional to the rate $\Omega$ of turn of the craft and a polarity indicative of the sense of turning thereof. The direct current rate of turn signal may be applied to utilization apparatus such as a navigation control system or signal processor or may be displayed on a meter such as a zero center meter 34.

The output of one of the detectors, such as photodetector 30b, is coupled to a second conventional phase detector 10, to a second input 8b of which is coupled the reference wave generated at the frequency $f_m$ by modulating oscillator 7, which oscillator preferably generates a sine wave signal at a frequency relatively higher than that useful in the prior art, a frequency of 100 MHz, for example. The output of reference oscillator 7 is used for a second purpose, being fed via lead 8a to summing amplifier 6; also a varying direct error voltage resulting from phase detection in detector 10 is coupled via lead 9 to a second input of summing amplifier 6. The output of amplifier 6 is coupled to a conventional voltage-controlled oscillator 4 to generate a frequency modulated signal $f_1$ about a center frequency $f_{10}$ on lead 3 for actuating the acousto-optic transducer 2. Thus, the error signal at lead 9 is no longer derived by mechanical modulation of the actual length of the passive ring 27 as in the prior art; instead, the frequency of the spectral line output is now modulated in a novel manner by the acousto-optic modulator 2 so as to bring the optical wave length to the optical resonance condition.

The conventional acousto-optic device 2 achieves a high frequency scan of the laser signal $f_0$ across the optical path resonance; any of several choices may be made, but the preferred kind of acousto-optical modulator 2 is one in which the laser light beam passes through an optically transparent medium in which acoustic waves readily propagate. In this situation, the array of acoustic waves forms an optical phase grating and the light beam will be instantaneously diffracted according to Bragg's law. In addition, since the effective grating is travelling at the speed of sound in the acoustic medium, the wave length of the refracted beam will differ from that of the incident light beam, the optical frequency shift $\Delta f_0$ being equal to the acoustic frequency $f_a$. Thus, the acousto-optic device 2 shifts the frequency $f_0$ of the laser beam by the driving acoustic frequency $f_1$. The value of $f_1$, and therefore of $f_0+f_1$ fed into beam splitter 21, is determined by the voltages applied by summing amplifier 6 in the feedback loop to voltage controlled oscillator 4. The frequency $f_1$ is itself modulated:

$$f_1 = f_{10} + f_a \sin \omega_m t \qquad (1)$$

Frequencies $f_{10}$ and $f_1$ are about 40 or 80 MHz, while $f_a$ is about 5 MHz, for example. The modulation frequency is again $f_m$. Accordingly, the effective optical wave length is swept through the effective passive path or loop resonance and the center frequency $f_{10}$ is thus changed to match any change in the loop path length. Suitable devices for use as the acousto-optic modulator appear widely in the literature; one is offered on the market as the coherent Model 304 Acousto-optic Modulation System by Coherent Associates, a subsidiary of Coherent, Inc., 14 Finance Drive, Commerce Park, Danbury, Conn. 06810.

In this type of modulator, there is passed therethrough a zero order beam, undeflected and not shifted in frequency. This beam is not used and may be blocked by simple irises. A first order beam is the desired beam, being shifted in frequency. There is a deflection of the first order beam but the deflection is small and insignificant in the operation of the invention.

Figure 2:
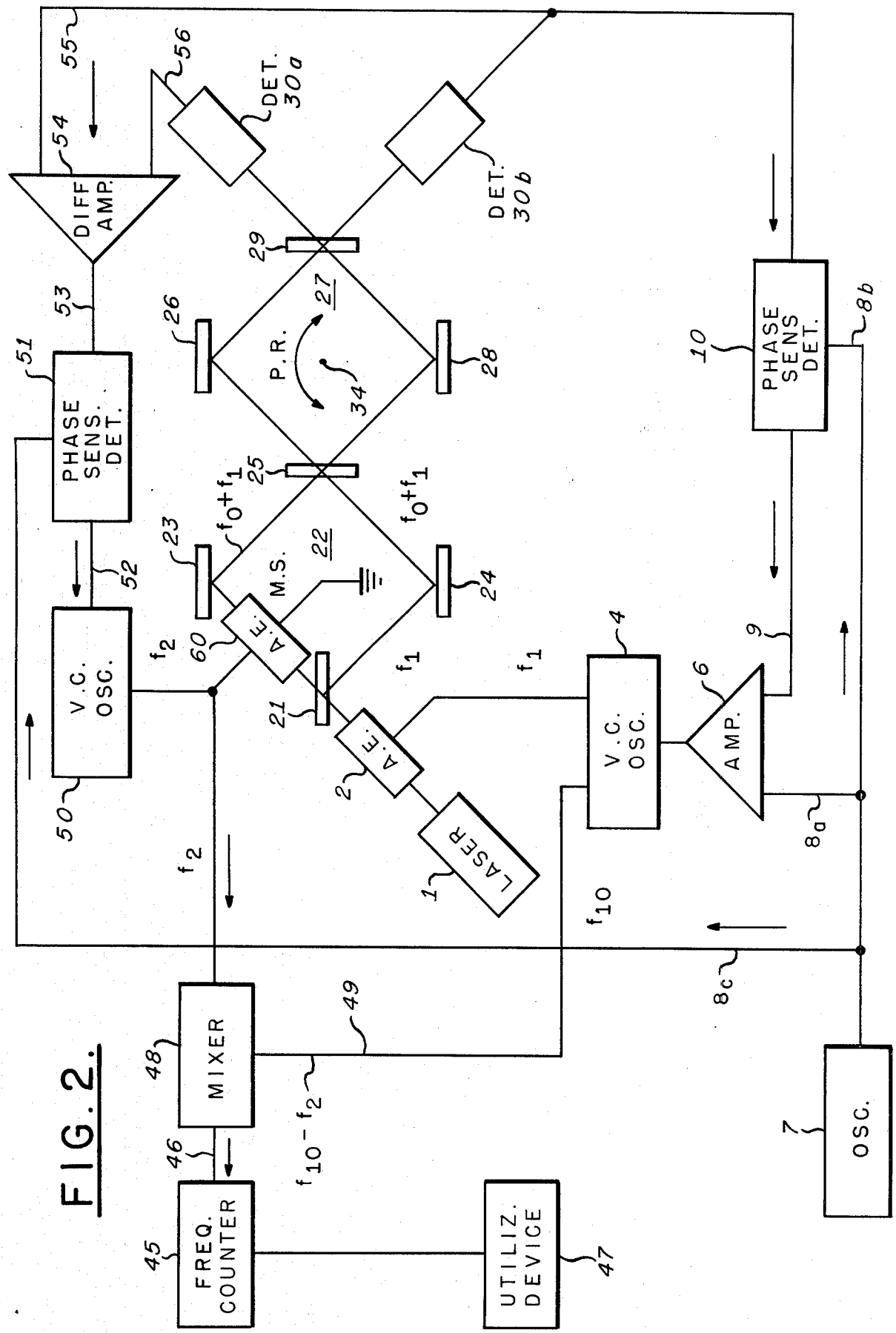
FIG. 2 is a diagram similar to FIG. 1 of a second embodiment of the invention.

In the kindred inertial rotation detection system of FIG. 2, the original servo loop including v.c. oscillator 4 locks the frequency $f_1$ to the effective path length resonance of the clockwise flowing wave. A second or $f_2$ servo loop including v.c. oscillator 50 locks the effective counter-clockwise wave to the corresponding clockwise path resonance. Ideally, when the system is not rotating about axis 34, $f_1$ and $f_2$ are equal; when there is rotation present, the rotation rate is proportional to $f_1-f_2$ or $f_2-f_1$, depending on the sense of rotation about axis 34. In FIG. 2, it will be understood that parts which correspond to those of FIG. 1 are identified with respective common reference numerals, including laser 1, voltage controlled oscillator 4, amplifier 6, oscillator 7, phase sensitive detector 10, optical divider 21, mirrors 23, 24, 25, 26, 28, 29, mirror system 22, passive ring 27, and detectors 30a, 30b.

In FIG. 2, the output of detector 30b is supplied through phase detector 10 of an $f_1$ servo loop rather similar to the $f_1$ servo loop of FIG. 1, to control the acousto-optic modulator 2 placed before mirror 21 of mirror system 22. In the adjacent arm of mirror system 22 lying between mirrors 21 and 23, there is placed a second acousto-optical modulator 60 which preferably is a substantially duplicate of modulator 2.

The second or frequency $f_2$ servo loop of FIG. 2 derives control signals from both detectors 30a, 30b which are coupled to a conventional differential amplifier 54 similar to amplifier 32 via leads 55, 56. The amplified output signal is coupled via lead 53 to a phase sensing detector 51 similar to detector 10. A second input to phase detector 51 is the reference signal at frequency $f_m$ supplied via lead 8c from oscillator 7. The error voltage output on lead 52 generated by detector 51 acts to determine the frequency of the output signal of voltage-controlled oscillator 50 which, in turn, actuates the second acousto-optic modulator 60 at frequency $f_2$. The frequency of oscillator 50 is now locked to the rate of turn of the inertial instrument which may be counted or displayed, for example, on a frequency sensitive electric meter 47 or otherwise employed. For this purpose, the $f_{10}$ output terminal of v.c. oscillator 4 is coupled via lead 49 to mixer 48. Mixer 48 and counter 45 supply a d.c. output whose amplitude is proportional to the rate $\Omega$ of turning of the craft and whose polarity is indicative of the sense of turning thereof. This d.c. output may be coupled to display utilization apparatus, such as display apparatus 47.

When the two acousto-optic modulators of FIG. 2 are used, effectively one for each of the counter-rotating light beams, a situation is achieved not even theoretically possible with the use of a piezoelectric modulator. In the case that the optical path is not simultaneously at resonance when the counter-rotating beams are at the same wave length, the wave length of one of the beams can be altered with respect to that of the other, bringing both beams simultaneously into the resonance condition. Moreover, the acoustic frequency difference between the two v.c. oscillators varies linearly with the rotation rate $\Omega$ in the same way as does the optical heterodyne frequency of an active ring laser.

It is seen that the invention overcomes problems present in the prior art through the novel use of acousto-optical modulation apparatus for controlling and stabilizing the apparatus by altering the wave length of the laser light entering the measurement loop or ring, the frequency of the modulated laser beam being swept through the actual loop resonance. According to the invention, the acousto-optical method used operates at a sufficiently high frequency that the resonant loop path length may be permitted to follow noise fluctuations in the length of its optical path and the system still desirably tracks the varying resonance point.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. In a rate of turn measuring device of the type including a monochromatic beam, a beam splitting system, and a passive ring to which first and second beams are coupled from the beam splitting system to traverse the path therein in opposite directions, the improvement comprising:

first modulator means responsive to said monochromatic beam for coupling a frequency modulated beam about a first center frequency to said beam splitting system, thereby causing said first and second beams traversing said passive ring to be frequency modulated;

detector means coupled to receive said first and second frequency modulated beams from said passive ring for producing electrical signals representative of said first and second beams;

signal generator means coupled to said first modulator means for providing a modulating signal that is frequency modulated about a second center frequency;

frequency shift means responsive to said signal representative of said first beam and coupled to said signal generator means for controlling said modulating signal; and means coupled to receive said signals representative of said first and second beams for producing a signal representative of instantaneous differences therebetween.

2. The improvement of claim 1 wherein said beam splitting means includes second modulator means positioned to couple to said second frequency modulated beam for frequency shifting said second frequency modulated beam, the improvement further comprising:

first phase detector means coupled to said instantaneous difference means and to said frequency shift means for providing a signal responsive to said signal representative of said instantaneous difference and a reference signal coupled from said frequency shift means; and second signal generator means coupled between said second modulator means and said first phase detector means for providing a modulation signal to said second modulator means.

3. The improvement of claim 2 wherein said frequency shift means includes:

oscillator means for providing a modulation signal at a modulation frequency, said signal coupled to said first phase detector means as said reference signal;

second phase detector means coupled to said detector means and said oscillator means for providing a signal in response to said electrical signal representative of said first beam and said modulation signal; and sum means coupled to receive said modulation signal and said responsive signal from said second phase detector means for providing a signal to said first signal generator means representative of the sum of said modulation signal and said responsive signal from said second phase detector means.

4. The improvement of claim 3 further including a mixer coupled to receive said modulation signal from said second frequency generator means and said signal at said center frequency from said first frequency generator means for providing a signal having a frequency substantially equal to the difference of said center frequency and said frequency of said modulation signal, said difference frequency being representative of said rate of turn.

5. An improvement in accordance with claim 1 wherein said modulation means comprises an acousto-optic modulator.

6. The improvement in accordance with claim 4 wherein said first and second modulation means comprise acousto-optic modulators.

7. The improvement of claims 5 or 6 wherein said frequency shift means includes:

oscillator means for providing a modulation signal at a modulation frequency;

phase detector means coupled to said detector means and said oscillator means for providing a signal in response to said modulation signal and said electrical signal representative of said first beam;

summation means responsive to said modulation signal and said responsive signal for providing a signal representative of the sum of said modulation and said responsive signals; and controlled oscillator means coupled between said summation means and said modulation means for providing said modulation signal to said modulation means in response to said sum signal.

* * * * *